(12) United States Patent
Ravindran et al.

(10) Patent No.: US 8,805,969 B2
(45) Date of Patent: Aug. 12, 2014

(54) HBA BOOT USING NETWORK STORED INFORMATION

(75) Inventors: Vinodh Ravindran, San Jose, CA (US); Ramkumar Vadivelu, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1384 days.

(21) Appl. No.: 12/117,606

(22) Filed: May 8, 2008

(65) Prior Publication Data
US 2009/0282135 A1 Nov. 12, 2009

(51) Int. Cl.
*G06F 15/177* (2006.01)
*H04L 29/08* (2006.01)
*G06F 9/44* (2006.01)

(52) U.S. Cl.
CPC ............ *H04L 67/1097* (2013.01); *H04L 67/34* (2013.01); *G06F 9/4416* (2013.01)
USPC ....................................................... 709/220

(58) Field of Classification Search
CPC ...... G06F 3/067; G06F 3/0632; G06F 11/201
USPC ....................................................... 709/220
See application file for complete search history.

(56) References Cited

U.S. PATENT DOCUMENTS

| | | | |
|---|---|---|---|
| 7,093,120 B2 * | 8/2006 | Keohane et al. ................. 713/2 |
| 7,139,845 B2 | 11/2006 | Kaushik | |
| 7,286,528 B1 * | 10/2007 | Pannell ........................ 370/389 |
| 7,328,260 B1 * | 2/2008 | Muthiyan et al. ............. 709/224 |
| 7,392,328 B2 | 6/2008 | Kaushik | |
| 7,433,300 B1 * | 10/2008 | Bennett et al. ................ 370/216 |
| 7,516,245 B2 | 4/2009 | Kaushik | |
| 7,571,261 B2 | 8/2009 | Kaushik | |
| 7,590,648 B2 * | 9/2009 | Shankar et al. ....................... 1/1 |
| 7,620,742 B2 | 11/2009 | Kaushik | |
| 7,797,288 B2 * | 9/2010 | Zhang et al. .................. 707/694 |
| 7,843,906 B1 * | 11/2010 | Chidambaram et al. ...... 370/386 |
| 7,843,907 B1 * | 11/2010 | Abou-Emara et al. ........ 370/386 |
| 7,865,627 B2 | 1/2011 | Kaushik | |
| 7,885,256 B1 * | 2/2011 | Yenamandra et al. ........ 370/389 |
| 7,886,031 B1 * | 2/2011 | Taylor et al. .................. 709/221 |
| 2004/0230704 A1 | 11/2004 | Balasubramanian | |
| 2004/0243796 A1 * | 12/2004 | Keohane et al. .................. 713/2 |
| 2006/0155748 A1 * | 7/2006 | Zhang et al. .................. 707/102 |

OTHER PUBLICATIONS

"Fibre Channel—Fabric Generic Requirements (FC-FG);" American National Standards Institute; ANSI X3.289-1996; Dec. 4, 1996; pp. beginning to 23.
"Fibre Channel—Physical and Signaling Interface (FC-PH) Rev. 4.3;" American National Standard for Information Systems; Jun. 1, 1994; pp. beginning-14, 98-99.
"Fibre Channel—Framing and Signaling (FC-FS) Rev. 1.70;" NCITS working draft proposed American National Standard for Information Technology; Feb. 8, 2002; pp. beginning to 10, 80-81.

* cited by examiner

*Primary Examiner* — Kristie Shingles
(74) *Attorney, Agent, or Firm* — Wong, Cabello, Lutsch, Rutherford & Brucculeri, L.L.P.

(57) ABSTRACT

A storage area network (SAN) fabric stores configuration information for servers connected to the SAN fabric. Configuration data can include target boot device address, topology configuration, etc. The configuration data is stored in a zone database as a zone member list. The zone database is accessible via a name server. To boot from a target boot device connected to the SAN fabric, the server first logs in to the fabric to register with the name server. The server then sends a configuration query to the name server. The name server replies with a member list that includes the address of the target boot device. The server establishes communication with the target boot device and accesses the boot code. The server then runs the boot code to initiate the boot process.

18 Claims, 3 Drawing Sheets

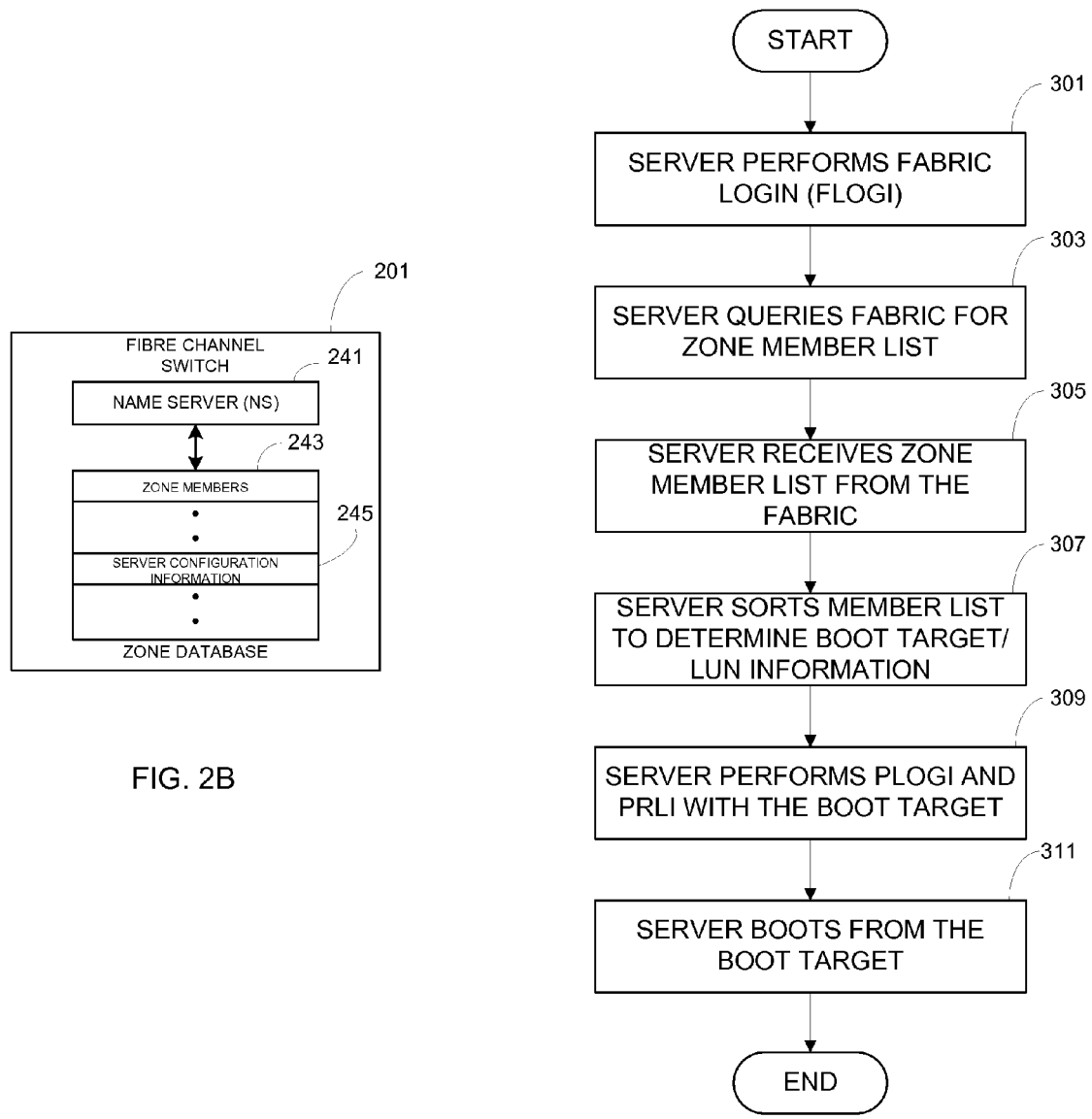

HBA BOOT USING NETWORK STORED INFORMATION

BACKGROUND OF THE INVENTION

1. Field of the Invention

The present invention relates generally to storage area networks. Particularly, the present invention relates to configuring a server form a storage area network.

2. Description of the Related Art

Booting is a process that starts operating systems when a computer system is turned on. It is an iterative process of loading the installed operating system code from a storage device into computer memory. For example, in an IBM® compatible personal computer, the Basic Input/Output System (BIOS) is loaded first. The BIOS initializes the computer hardware and reads the code from a storage device necessary to begin the next stage of booting. Next, the hardware setup is completed and a fully functional operating system is loaded in the memory. The boot process can be invoked from a direct attached disk, e.g., a hard-drive, a CD-ROM, etc., from a local area network, e.g., Ethernet, or from a storage area network (SAN), e.g., Fibre Channel SAN, iSCSI SAN, etc.

Booting from a SAN offers several advantages over booting from a direct attached disk—a few of which are discussed here. Booting from SAN alleviates the necessity for each computer system, e.g., a server, to house a local disk drive—resulting in savings in space due to server consolidation and savings in power consumption due to fewer hardware components. Further, operating system images can be stored to disks on the SAN, which allows all upgrades and fixes to be managed at a centralized location. This eliminates the need to manually install upgrades on each system. In instances of server failure, a new server can be quickly deployed into operation by replicating the configuration information of the failed server onto the new server and allowing the new server to boot from the SAN. This results in smaller downtimes compared to direct attached disk based servers where the new server would require the time consuming task of reinstalling the operating system on the disk drive.

In Fibre Channel SANs, for example, servers communicate with the SAN through host bus adaptors (HBAs). Typically, the HBA BIOS contains data and instructions that enable the server to locate the boot disk on the SAN. The data may include, among other things, the world wide name (WWN) and the logic unit number (LUN) of the boot device. Prior to deployment of the server, the firmware on the HBA is configured to include the WWN and the LUN of the storage device. Once the server is connected to the SAN, the HBA logs on the SAN and subsequently communicates with the boot device associated with the stored WWN and LUN to begin the boot process.

Occasionally, the data and instructions, related to locating the boot disk, stored on the HBA may have to be updated. For example, failure of the currently assigned boot disk may require that the server boot from another boot disk at a different location in the SAN. Therefore, the WWN and the LUN, related to the boot disk, stored in the HBA needs to be updated. Also, changes in the zoning configuration of the SAN may result in certain boot disks to be removed from the member list for that zone, which, in turn, requires that the information on the HBA be updated. Updating the server HBA firmware each time to reflect changes made elsewhere in relation to the SAN and the target boot device is time consuming and cumbersome.

SUMMARY OF THE INVENTION

A storage area network (SAN) is disclosed having a plurality of servers and storage devices connected to the SAN fabric. The fabric comprises a plurality of interconnected switches that allow the servers to communicate with the storage devices. The fabric may configure zones that restrict the communication between servers and storage devices to within the zone. The configuration data for the servers is stored in the fabric. The configuration data can include target boot device address, topology configuration, etc.

The switch includes a name server, which provides devices connected to the fabric a list of other accessible devices connected to the fabric. The switch also includes a zone database that is accessible to the name server. The zone database stores a list of zone members corresponding to a zone configuration. In addition, the zone database can store server configuration information in the zone member list. The system administrator can load the zone database with server configuration as zone member list. The zone member list is indexed via a zone name that includes a unique prefix, the server HBA's world wide name (WWN), and a code identifying configuration type.

The target boot device address comprises of the storage device WWN and the LUN. These 16 bytes of data are split into four 4-byte data blocks and zone member values in the zone database. These zone members are associated with the index that contains the unique prefix, the server's HBA WWN and the configuration type.

When a server needs to boot from a target boot device on the fabric, the server's HBA first performs a fabric login (FLOGI), which establishes a session between the server and the fabric. Once FLOGI is successful, the server sends to the name server a query containing the unique prefix, the HBA WWN and a code indicating that the configuration type is boot. The name server accesses the zone database based on the query and retrieves the associated zone member list. This member list is sent back to the server HBA. The server HBA arranges the four 4-byte data blocks in correct order and concatenates the first two four byte data blocks to determine the WWN and the next two 4-byte data blocks to determine the LUN of the target boot device.

Once the address of the target boot device is known, the server can perform a port login (PLOGI) with the target boot device HBA to establish a communication channel and exchange operational parameters. Following a successful PLOGI, the server can initiate a process login (PRLI) to create a process image pair. Upon successful PRLI, the server HBA can load the boot code from the target boot device and start the boot process.

Changes in server configuration data due to device failures or zone configuration modifications can be easily made by updating the zone database.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 2A-2B show detailed views of a Fibre Channel network communication system and a Fibre Channel switch according to the present invention; and FIG. 3 shows a flowchart illustrating the process to boot a server from a target boot device according to the present invention;

DETAILED DESCRIPTION OF THE PREFERRED EMBODIMENTS

Figure 1:
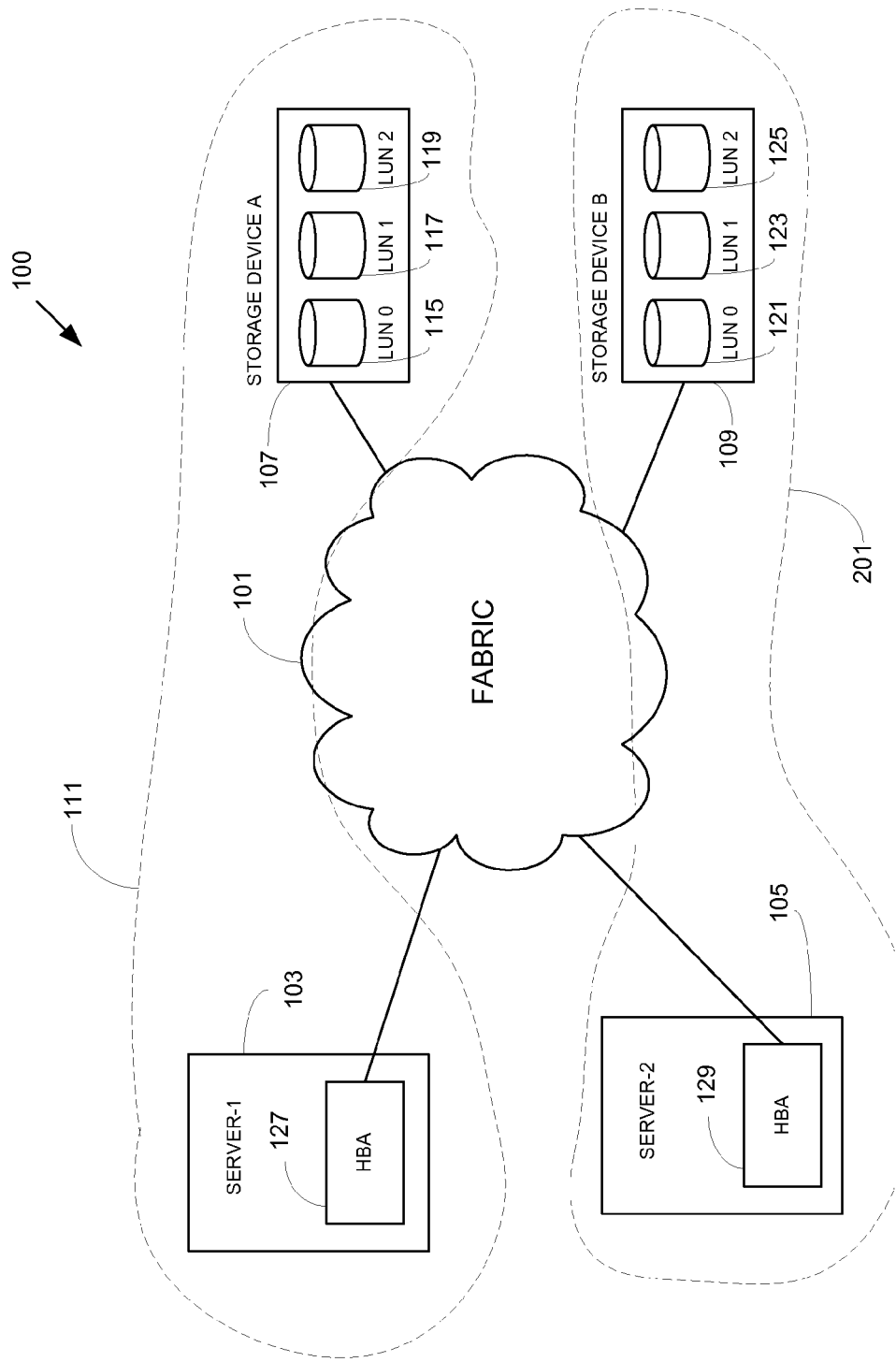
FIG. 1 illustrates the a Fibre Channel network communication system utilizing zoning.

FIG. 1 shows a Fibre Channel network communication system 100 in accordance with an embodiment of the present invention. As used herein, the term "Fibre Channel" refers to the Fibre Channel family of standards as well as other flexible, expandable network connectivity systems capable of moving data over long distances and supporting a variety of protocols. The Fibre Channel network communication system 100 includes a fabric 101 and a plurality of devices, such as server-1 103, server-2 105, storage device A 107, and storage device B 109. The fabric 101 is coupled to the plurality of devices to allow the devices to communicate with each other. Server-1 103 and server-2 105 are communicably connected to the fabric 101 via host bus adapters (HBAs) 127 and 129, respectively. The HBAs 127 and 129 typically include firmware (including device drivers for communication) processed by special processors (e.g., ARM®, Tensilica®, etc.). Portions of the HBA's processing can also be shared by the server CPU. In such cases, the HBA may include only controllers for carrying out physical level communication with the fabric, while all other data processing is carried out by the server CPU.

Storage device A 107 and B 109 can include a number of component devices like virtual hard disks, tape drives, etc. For storage device A, these component devices are labeled LUN0 115, LUN1 117, and LUN2 119, while the component devices within storage device B are labeled LUN0 121, LUN1 123, and LUN2 125. Note that one or more of the component devices within storage device A 107 and storage device B 109 may serve as a boot device that includes boot code and an operating system.

Zoning is a fabric management service that can be used to create logical subsets of devices within a SAN, and enables the partitioning of resources for the management and access control of frame traffic. More details on zoning and how to implement zoning are disclosed in commonly assigned U.S. Pat. No. 6,765,919 entitled "Method and system for Creating and Formatting Zones Within a Fibre Channel System," by David Banks, Kumar Malavalli, David Ramsay, and Teow Kah Sin, filed Oct. 22, 1999, and U.S. Pat. No. 7,167,472, entitled "Fibre Channel Zoning by Device Name in Hardware," by Ding-Long Wu, David C. Banks and Jieming Zhu, filed Apr. 17, 2002, which are hereby incorporated by reference.

Referring again to FIG. 1, the Fibre Channel system 100 includes two zones 111 and 113. Zone 111 contains server-1 103 and storage device A 107. Zone 113 includes server-2 105 and storage device B 109. Only devices within the same zone may communicate with each other. For example, server-1 103 and storage device A 107 may communicate with each other because they are both members of zone 111. Likewise, server-2 105 and storage device B 109 may communicate with each other because they are both members of zone 113. However, server-1 103 cannot communicate with storage device B 109 because they are not both members of the same zone.

Figure 2A:
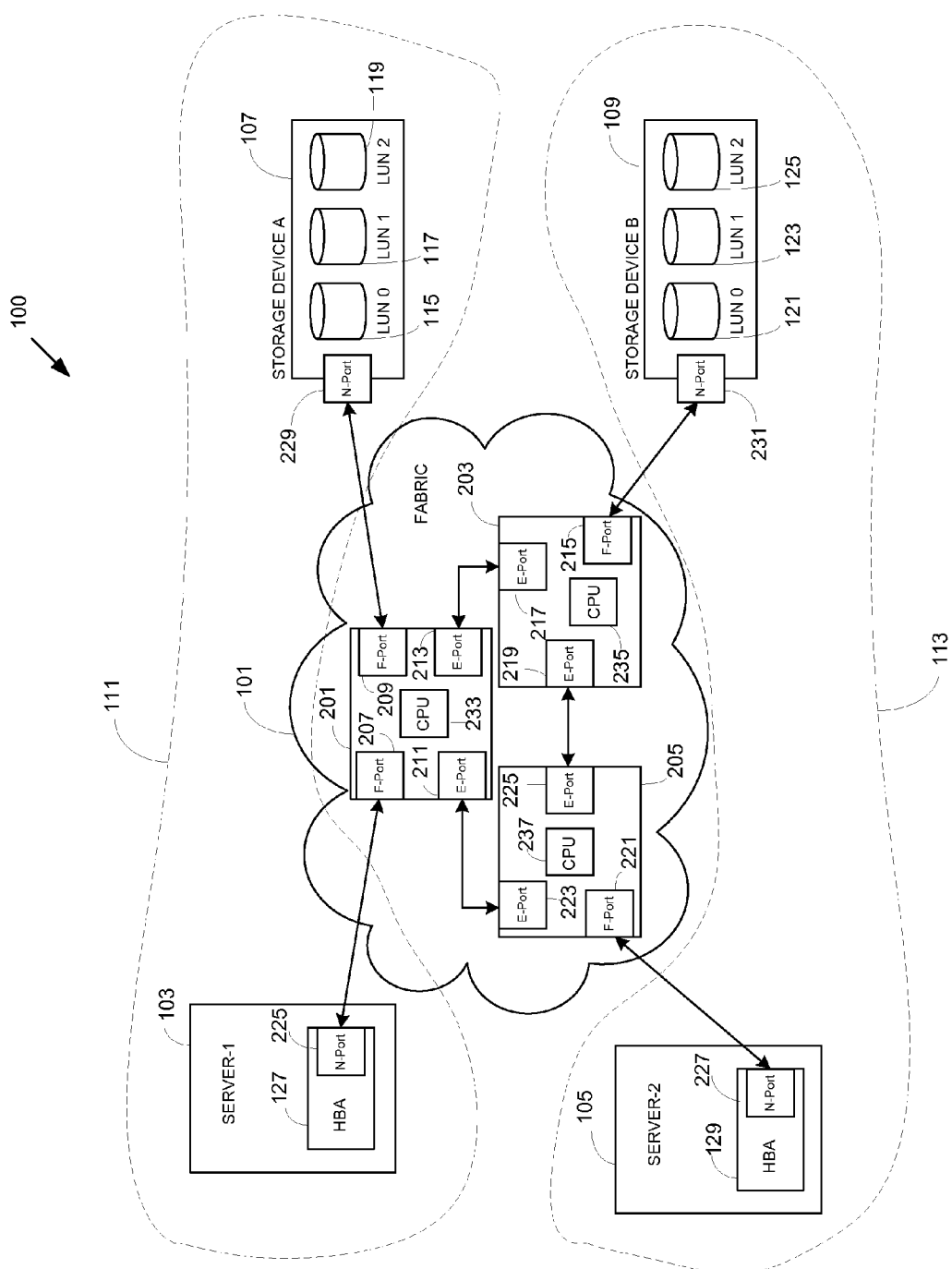

FIG. 2A shows further details of the fabric 101, storage devices A 107 and B 109, and servers-1 103 and -2 105. Fabric 101 is comprised of three fabric elements, switch 201, switch 203, and switch 205. The fabric elements may be SilkWorm® switches manufactured Brocade®, or any other appropriate network switch. Each switch 201, 203, and 205, contains ports to which devices may be coupled. The ports can be implemented on application specific integrated circuits (ASICs) that may be plugged into or removed from a switch, thus allowing modularity regarding what ports are supported by each switch. Different types of ports support different types of connections from devices to a switch. An F_Port is a label used to identify a port of a fabric that is used to directly couple the fabric to a single device, such as a computer or peripheral. An FL_Port is a label used to identify a port of a fabric that is used to couple the fabric to a loop. The label N_Port is used to identify a port of a node through which the node connects to the fabric's F_Port. An NL_Port is capable of connecting a node to both fabric and arbitrated loop topologies. The node may be a server, peripheral device, etc. The F_Port and FL_Port will be referenced jointly as Fx_Port. Similarly, the N_Port and NL_Port will be referenced jointly as Nx_Port. An E_Port is a label used to identify an inter-switch expansion port used to connect to an E_Port of another switch in order to build a larger switch fabric.

For the embodiment shown in FIG. 2A, the relevant ports on switch 201 are F_Ports 207 and 209, and E_Ports 211 and 213. Switch 203 includes F_Port 215 and E_Ports 217 and 219. Switch 205 includes F_Port 221 and E_Ports 223 and 225. Switches 201 and 203 are coupled via E_Ports 213 and 203, switches 203 and 205 are coupled via E_Ports 219 and 225, and switches 205 and 201 are coupled via E_Ports 223 and 211. Server-1 is coupled to F_Port 207 of switch 201 via N_Port 225 of HBA 127. Server-2 is coupled to F_Port 221 of switch 205 via N_Port 227 of HBA 129. Storage device A is coupled to the F_Port 209 of switch 201 via N_Port 229, and storage device B is coupled to the F_Port 215 of switch 203 via N_Port 231. Note that both storage devices A 107 and B 109 in FIG. 2A include HBAs, but the HBAs have not been shown for simplicity, only the N_Ports are shown.

Each switch 201, 203, and 205 also contains an embedded central processing unit (CPU) module 233, 235, and 237 which controls the switch. These CPU modules typically include some sort of processor as well as local memory. As part of this control, each embedded CPU module 233, 235, and 237 provides support to its associated switch for operating a Name Server (NS) module. FIG. 2B shows a detailed view of switch 201 that includes a NS 241 and a zone database 243. The NS 241 provides address information to devices about other devices connected to the fabric. As part of the Fibre Channel standards, N_Ports joining a fabric must typically register their Fibre Channel attributes with the NS 241. They typically also query the NS 241 for address information and attributes of other devices (e.g., other N_Ports) on the fabric. In response, the NS 241 provides an address list of other devices on the fabric. If address information changes at a later time (for example, due to zoning changes) the fabric sends a change signal to each device to instruct them to re-query the NS 241 for updated address information. The NS 241, and all associated data, is duplicated on each switch belonging to the fabric. The distributed nature of the NS 241 allows a device connected to any Fx_Port of the fabric to receive the same information regarding the fabric. For example, in switches 201, 203, and 205 of FIG. 2A, the NSs as well as the fabric data on each switch are congruent.

Additional zoning software is added to existing NS 241 addressing functions to implement zoning. The zoning software loads zoning configuration information in the form of a zone database 243 into the CPU of each switch. The zone database 243 is replicated and propagated to each individual fabric switch. For each switch, the data within the zone database 243 is accessible to the NS 241. In addition to the zoning configuration, the zone database 243 can also store server configuration information 245 according to the present invention. The server configuration can include address of the target boot device, port link and topology configuration, etc.

As shown in FIG. 2B, the zone database 243 stores zone members associated with a particular zone. One way of storing server configuration information in the zone database 243 is by using special encoded zone names and by storing configuration data as zone members, as shown in entry 245 of FIG. 2B. For example, the zone name may take the form: <unique_prefix>_<HBA_PORT_WWN>_<CFG_TYPE>. The field "unique_prefix" serves as a unique zone identifier. The field "HBA_PORT_WWN" signifies the WWN of the Nx_Port of the HBA that the server uses to connect to the SAN. The field "CFG_TYPE" signifies the type of server configuration information. For example, the zone name field, when used for storing server configuration information, may look like "SCZ__0100051E01020304__00." Here "SCZ" is the unique_prefix identifying the zone name reserved for server configuration. This prefix may be in ASCII, or numeric, or alphanumeric. The length of the prefix may also be different from the one shown in this example. "0100051E01020304" is the WWN of the N_Port (e.g., reference 225, FIG. 2A) of the server HBA (e.g., HBA 127 of server-1 103 in FIG. 2A). This is the typical 64-bit address assigned to an N_Port in Fibre Channel based networks. However, the field length may vary if the SAN is based on a technology other than Fibre Channel. Finally, code "00" signifies that the configuration information corresponds to an address of the target boot device. Other codes (e.g., 01, 11, etc.) may signify other configuration information such as port link, topology configuration, etc.

Continuing with the above example, the configuration data for the server can be stored in the corresponding member list. For example, referring again to FIG. 2A, if the server-1 103 is assigned to boot from the target boot device LUN0 115 having a target WWN of 01:02:03:04:05:06:07:08 and a LUN value of 0x09AABBCCDDEEFF00, the zone member entries for the zone corresponding to SCZ__0100051E01020304__00 may be created by the system administrator by executing the following command: zonecreate "SCZ__0100051E01020304__00", "00:00:00:00:00:01:02:03; 00:00:00:01:05:06:07:08; 00:00:00:02:09:AA:BB:CC; 00:00:00:03:DD:EE:FF:00". The above command "zonecreate" will create a tuple representing the zone members of the zone SCZ__0100051E01020304__00 in the zone database 243. The first four bytes of each attribute represent an index while the last four bytes represent a portion of the boot WWN or LUN value. In the above example, the target WWN and the LUN value together constitute 16 bytes. In the zone database tuple, the first attribute has first four bytes as "00:00:00:00" and the last four bytes as the first four bytes "01:02:03:04" of the target WWN (01:02:03:04:05:06:07:08). The second attribute has first four bytes as "00:00:00:01" and has the last four bytes as the last four bytes "05:06:07:08" of the target WWN (01:02:03:04:05:06:07:08). Similarly, the third and fourth attribute of the tuple includes the first four and the last four bytes of the target LUN value (0x09AABBCCDDEEFF00), respectively.

A person skilled in the art will appreciate that the data structure employed by the zone database 243 to store information regarding the zone members and the address of the boot device is not limited to the one described in the above example. The zone database 243 may also use a hierarchical tree-like data structure or may use various relational models known in the art. Updating the zone database 243 with entries that correspond to configuration data of a server may be carried out by the system administrator prior to connecting the server to the SAN. Techniques other than the zonecreate command, such as the interfaces associated with management applications, can also be used enter configuration information.

FIG. 3 shows the steps involved in booting a server from a boot target in accordance with an embodiment of the present invention. FIG. 3 uses server-1 103 and component device LUN0 115 of storage device A 107, both of FIG. 2A, as examples of the server to be booted and the target boot device, respectively. Note that the target boot device may be any storage device belonging to zone 111 of FIG. 2A.

In step 301, server-1 103 performs fabric login (FLOGI), which establishes a session between an N_Port 225 of the HBA 127 and the F_Port 207 of switch 201. Typically, HBA 127 will send a FLOGI frame that contains its Node Name (e.g., WWN), its N_Port name, and service parameters to a login server at a well known address 0xFFFFFE. In response, the fabric 101 provides the N_Port with an address or fabric ID and fabric characteristics as defined by the fabric's service parameters. Furthermore, the fabric 101 registers the WWN of the HBA 127 with the NS 241 database and correlates the WWN with the fabric ID.

Once FLOGI is successful, server-1 103 sends a query to the fabric 101 for a member list of zone 111 to which it has been assigned to (step 303). This query is typically accomplished by the code included in the BIOS of the server-1 103 HBA 127. For example, the HBA 127 may send a "get zone member list (GZM_CT)" query to the NS 241 at a well known address of 0xFFFFFC to receive a list of member nodes belonging to a particular zone. This query can include the unique zone identifier for which the zone database 243 stores the server configuration information. For example, the HBA 127 may send the query GZM_CT with the payload including the zone name SCZ__0100051E01020304__00.

In response, the NS 241 on switch 201 replies with a frame whose payload includes a list of zone members corresponding to the entry SCZ__0100051E01020304__00 in the zone database 243. HBA 127 receives this data from the NS 241 in step 305. Referring to the example presented earlier with respect to storage of configuration data in the zone database 243, the member list received by HBA 127 contains the WWN and LUN value of the target boot device (LUN0 115 of storage device A 107). Note that the member list received from the NS 241 may or may not be ordered. In other words, the NS 241 ensures that each attribute associated with the zone entry in the database is returned to HBA 127; however it does not guarantee any particular order in which the attributes are arranged in the returned frame.

In step 307, HBA 127 determines the first four bytes of each attribute received and sorts the attributes in increasing order. For example, if the member list received is: 00:00:00:02:09:AA:BB:CC, 00:00:00:00:00:01:02:03, 00:00:00:01:05:06:07:08, and 00:00:00:03:DD:EE:FF:00, the HBA 127 will sort the member list in the following order of increasing index: 00:00:00:00:00:01:02:03, 00:00:00:01:05:06:07:08, 00:00:00:02:09:AA:BB:CC, and 00:00:00:03:DD:EE:FF:00. Having ordered the received member list, the HBA 127 extracts the last four bytes of each attribute, concatenates the last four bytes of the first two members to form the WWN, and concatenates the last four bytes of the next two members to form the LUN value. For example, "01:02:03:04" and "05:06:07:08" are concatenated to form the WWN "01:02:03:04:05:06:07:08," and "09:AA:BB:CC" and "DD:EE:FF:00" are concatenated to form the LUN value "0x09AABBCCDDEEFF00."

Once the target boot device's WWN and LUN value have been acquired by the HBA 127, in step 309 the HBA 127 proceeds to execute port login (PLOGI) with the N_Port 229 of the storage device A 107. PLOGI enables the HBA 127 N_Port 225 to create a communication channel with the N_Port of storage device A 107 by setting and exchanging operational parameters such as end-to-end credit.

After a successful PLOGI, the HBA 127 initiates a process login (PRLI), which establishes a session between processes that are based on the N_Port 225 of the HBA 127 and the N_Port 229 of storage device A 107. After the session is established, the relationship between the communicating processes is called an image pair. If, for example, the data transfer between the devices is based on the SCSI protocol, the Fibre Channel protocol requires that an image pair exist beforehand. Finally, upon successful PRLI, in step 311 the HBA 127 executes appropriate processes that enable booting from the target boot device. Normally this involves obtaining the master boot record from the target boot device and proceeding with booting as normal for the particular operating system.

In cases where a boot device may fail, the code residing in the firmware of HBA 127 does not need modification. This is because the address of the boot device is acquired from the zone database 243, and not stored in the in HBA 127 firmware. Therefore, if any changes in the target boot device occur, the zone database 243 may be easily updated with new server configuration information 245. For example, if the target boot device LUN0 115 fails, the system administrator may choose LUN1 117 as the new target boot device. To reflect this change in the server-1 103 configuration, the system administrator simply replaces the WWN and LUN value of the failed device LUN0 115 with the WWN and LUN value of the new target device LUN2 117 in the zone database 243 of the fabric 101. No changes are made to the HBA 127 BIOS. Also, for example, if the zone configuration changes such that storage device B 109 instead of storage device A 107 is now a member of zone 111, then the system administrator updates the server-1 103 configuration entry 245 in the zone database 243 with the WWN and LUN value of a target boot device selected from the storage device B 109. Here again, no changes are made to the HBA 127 BIOS.

Thus, the embodiments of the present invention described above, allow configuring a server from the fabric the server is connected to. Server configuration information is stored in the zone database of a fabric switch instead of being stored in the server HBA's firmware. The server HBA queries the name server running on the switch for configuration information. Configuration information can include an address of a target boot device. Upon receiving the target boot device address, the server HBA obtains the master boot record from the target boot device and proceeds with booting the server operating system. Changes in server configuration (e.g., change in address of target boot device, or zone configuration) are reflected by modifying entries in the zone database. The server HBA's firmware is not modified. This results in smaller server down-times and more convenient server updates.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method for configuring a computing device communicably coupled to a storage area network (SAN) fabric, the method comprising:
   sending a configuration query to the SAN fabric;
   receiving configuration information related to booting the computing device from the SAN fabric; and
   configuring the computing device based on the received configuration information, wherein the configuration information comprises a target boot device address.

2. The method of claim 1, wherein the SAN fabric comprises a name server addressed at the well known address for processing the configuration query and retrieving configuration information from a database based on the configuration query.

3. The method of claim 2, wherein configuring the computing device further comprises accessing boot code from a storage device corresponding to the target boot device address, and running the boot code on the computing device.

4. The method of claim 2, wherein the database stores the target boot device address as a list, wherein each member of the list includes at least a portion of the target boot device address.

5. The method of claim 4, wherein each member of the list includes an index, such that ordering the members of the list according to their indices results in a desired order of the portions of the target boot device address in each member.

6. The method of claim 5, further comprising: the sorting the members of the list received from the SAN fabric based on the index of each member, extracting the portions of the target boot device address from each sorted member, and concatenating the portions to determine the target boot device address.

7. A switch communicably coupled to a computing device, the switch comprising:
   a database for storing configuration information related to booting the computing device; and
   a name server coupled to the database for receiving a configuration query from the computing device, accessing the database and retrieving the configuration information corresponding to the configuration query, and sending the configuration information to the computing device, wherein the configuration information stored in the database includes a target boot device address.

8. The switch of claim 7, wherein the database stores the target boot device address as a list, wherein each member of the list includes at least a portion of the target boot device address.

9. The switch of claim 8, wherein each member of the list includes an index such that ordering the members of the list according to their indices results in a desired order of the portions of the target boot device address in each member.

10. A host bus adaptor coupled to a computing device and communicably coupled to a SAN fabric, which, in turn, is coupled to a storage device, the host bus adaptor comprising:
    a port for sending data to and receiving data from the SAN fabric; and
    a processor operatively coupled to the port, wherein the processor executes code for sending a configuration query to the SAN fabric, receiving configuration information related to booting the computing device from the SAN fabric, and configuring the computing device based on the received configuration information, wherein the configuration information includes an address of the storage device.

11. The host bus adaptor of claim 10, wherein configuring the computing device comprises accessing boot code from the storage device.

12. A data network comprising:
   a SAN fabric; and
   a computing device communicably coupled to the SAN fabric, wherein the computing device receives configuration information related to booting the computing device from the SAN fabric, wherein the configuration information comprises a target boot device address.

13. The data network of claim 12, wherein the SAN fabric includes a switch, the switch communicably coupled to the computing device, the switch comprising:
   a database for storing the configuration information; and
   a name server addressed at the well known address and coupled to the database for receiving the configuration query from the computing device, accessing the database and retrieving the configuration information corresponding to the configuration query, and sending the configuration information to the computing device.

14. The data network of claim 13, wherein the database stores the target boot device address as a list, wherein each member of the list includes at least a portion of the target boot device address.

15. The data network of claim 14, wherein each member of the list includes an index such that ordering the members of the list according to their indices results in a desired order of the portions of the target boot device address in each member.

16. The data network of claim 15, wherein the host bus adaptor sorts the members of the list received from the name server, extracts the portions of the target boot device address from each sorted member, and concatenates the portions to determine the target boot device address.

17. A computing device communicably coupled to a SAN fabric, which, in turn, is coupled to a storage device, the computing device comprising:
   a host bus adaptor for communicating with the SAN fabric; and
   a server operatively coupled to the host bus adaptor, wherein the host bus adaptor comprises:
      a port for sending data to and receiving data from the SAN fabric; and
      a processor operatively coupled to the port, wherein the processor executes code for sending a configuration query to the SAN fabric, receiving configuration information related to booting the server from the SAN fabric, and configuring the server based on the received configuration information, wherein the configuration information includes an address of the storage device.

18. The host bus adaptor of claim 17, wherein configuring the computing device comprises accessing boot code from the storage device.

* * * * *